(12) United States Patent
Camargo

(10) Patent No.: US 10,931,739 B2
(45) Date of Patent: Feb. 23, 2021

(54) METHOD AND SYSTEM FOR GENERATING STRATEGY AND ROADMAP FOR END-TO-END INFORMATION TECHNOLOGY INFRASTRUCTURE CLOUD IMPLEMENTATION

(71) Applicant: Wipro Limited, Bangalore (IN)

(72) Inventor: Chelis Camargo, Colorado Springs, CO (US)

(73) Assignee: Wipro Limited, Bangalore (IN)

(*) Notice: Subject to any disclaimer, the term of this patent is extended or adjusted under 35 U.S.C. 154(b) by 19 days.

(21) Appl. No.: 16/368,084

(22) Filed: Mar. 28, 2019

(65) Prior Publication Data

US 2020/0314169 A1 Oct. 1, 2020

(51) Int. Cl.
| | |
|---|---|
| H04L 29/08 | (2006.01) |
| G06F 17/27 | (2006.01) |
| G06Q 10/06 | (2012.01) |
| H04L 29/06 | (2006.01) |
| G06F 40/30 | (2020.01) |

(52) U.S. Cl.
CPC .............. H04L 67/10 (2013.01); G06F 40/30 (2020.01); G06Q 10/067 (2013.01)

(58) Field of Classification Search
CPC ....... H04L 67/10; H04L 63/08; H04L 63/168; H04L 63/306; H04L 63/308; H04L 67/02; H04L 67/025; H04L 67/34; G06F 40/30; G06Q 10/067
See application file for complete search history.

(56) References Cited

U.S. PATENT DOCUMENTS

| | | | | |
|---|---|---|---|---|
| 8,200,527 B1* | 6/2012 | Thompson | ....... | G06Q 10/06398 705/7.39 |
| 2005/0119905 A1* | 6/2005 | Wong | ..................... | G06Q 10/06 705/50 |

(Continued)

FOREIGN PATENT DOCUMENTS

JP 2011150563 8/2011

*Primary Examiner* — Emmanuel L Moise
*Assistant Examiner* — Berhanu Shitayewoldetadik
(74) *Attorney, Agent, or Firm* — Finnegan, Henderson, Farabow, Garrett & Dunner, LLP

(57) ABSTRACT

This disclosure relates to method and system for generating strategy and roadmap for end-to-end information technology (IT) infrastructure cloud implementation. The method may include receiving natural language inputs from stakeholders with respect to a current IT infrastructure and a future IT infrastructure cloud implementation, receiving machine acquired data points from data centers, labelling human semantic data points in the natural language inputs and the machine acquired data points into labelled data points, mapping patterns in the labelled data points to a cloud implementation R-lane models, classifying a problem domain into classes of a cloud strategy based on at least one of the cloud implementation R-lane models, determining an implementable solution using at least one of a search, a backtracking, or a constraint propagation model to business constrains that are identified based on the classes, and generating an output artifact based on the implementable solution using a belief-desire-intention model.

18 Claims, 6 Drawing Sheets

(56) References Cited

U.S. PATENT DOCUMENTS

| | | | | |
|---|---|---|---|---|
| 2012/0330869 | A1* | 12/2012 | Durham | G06N 5/022 706/16 |
| 2013/0006679 | A1* | 1/2013 | Ruparelia | G06Q 10/00 705/7.11 |
| 2013/0262638 | A1* | 10/2013 | Kumarasamy | G06F 9/5077 709/221 |
| 2013/0262801 | A1* | 10/2013 | Sancheti | G06F 3/0619 711/162 |
| 2014/0278808 | A1 | 9/2014 | Iyoob et al. | |
| 2014/0279808 | A1* | 9/2014 | Strassner | G06Q 10/10 706/47 |
| 2016/0085856 | A1* | 3/2016 | Hall | G06F 40/295 706/46 |
| 2016/0149769 | A1* | 5/2016 | Joshi | H04L 41/5006 715/739 |
| 2016/0259623 | A1* | 9/2016 | Sumner | H04L 67/10 |
| 2017/0017505 | A1 | 1/2017 | Bijani et al. | |
| 2017/0069011 | A1* | 3/2017 | Akkiraju | G06Q 30/0625 |
| 2017/0109815 | A1* | 4/2017 | Bai | H04L 41/5029 |
| 2018/0150555 | A1* | 5/2018 | Karuppasamy | G06F 16/367 |
| 2018/0157768 | A1* | 6/2018 | Baughman | G06F 40/216 |
| 2018/0212985 | A1* | 7/2018 | Zadeh | H04L 63/1425 |
| 2018/0314503 | A1* | 11/2018 | Pirmoradi | G06F 8/71 |
| 2019/0042870 | A1* | 2/2019 | Chen | G06F 16/538 |
| 2019/0065582 | A1* | 2/2019 | Chandrakar | G06F 16/3329 |
| 2019/0171438 | A1* | 6/2019 | Franchitti | G06N 5/022 |
| 2019/0197119 | A1* | 6/2019 | Zhang | G06F 40/58 |
| 2019/0205775 | A1* | 7/2019 | Baughman | G06F 17/141 |
| 2019/0327314 | A1* | 10/2019 | Sahoo | H04L 67/16 |
| 2019/0349321 | A1* | 11/2019 | Cai | G06N 3/006 |
| 2019/0370388 | A1* | 12/2019 | Li | G06F 16/90344 |
| 2019/0371315 | A1* | 12/2019 | Newendorp | G10L 15/30 |
| 2020/0057964 | A1* | 2/2020 | Howard | G06N 20/20 |
| 2020/0089761 | A1* | 3/2020 | Guerra | G06F 16/90332 |
| 2020/0097867 | A1* | 3/2020 | Scriven | G06Q 10/06313 |
| 2020/0097961 | A1* | 3/2020 | Luo | H04L 9/3239 |
| 2020/0104402 | A1* | 4/2020 | Burnett | G06F 16/243 |

* cited by examiner

METHOD AND SYSTEM FOR GENERATING STRATEGY AND ROADMAP FOR END-TO-END INFORMATION TECHNOLOGY INFRASTRUCTURE CLOUD IMPLEMENTATION

TECHNICAL FIELD

This disclosure relates generally to a cloud implementation, and more particularly to method and system for generating strategy and roadmap for end-to-end information technology (IT) infrastructure cloud implementation.

BACKGROUND

Cloud computing has been widely accepted as a new paradigm in Information Technology (IT). Cloud computing utilizes a cloud environment for managing and delivering various services, and may change implementation of overall IT infrastructure of an enterprise. However, existing techniques to perform cloud implementation of IT infrastructure are limited in their scope and utility. For example, existing techniques are limited in capturing requirements or gathering data for cloud migration strategy, planning, or assessment in an effective and efficient manner. On one hand, current data center discovery capabilities (e.g., using either machine driven agent, using agentless discovery tools, etc.) may discover an entire data center infrastructure, but cannot apply semantic meaning or reasoning to business and operational criticality. On the other hand, the existing solutions for capturing business criticality may be static in nature (e.g., by way of collecting data using static forms), may lack artificial intelligence (AI) based natural language processing, and may not offer an excellence in the customer experience. Further, for example, existing solutions fail to provide complete and systematic information with respect to cloud implementation in an automated way. Existing solutions may require a lot of manual work (e.g., collecting and collating information; reading documents, modelling language, and architecture diagrams; etc.) so as to design, optimize, and provide an operational model for cloud implementation of an IT infrastructure.

SUMMARY

In one embodiment, a method for generating strategy and roadmap for end-to-end information technology (IT) infrastructure cloud implementation is disclosed. In one example, the method may include receiving natural language inputs from a plurality of stakeholders with respect to a current IT infrastructure and a future end-to-end IT infrastructure cloud implementation. The method may further include receiving a plurality of machine acquired data points from a plurality of data centers. The method may further include labelling a plurality of human semantic data points in the natural language inputs, generated using natural language processing (NLP), and the plurality of machine acquired data points into a plurality of labelled data points. The method may further include mapping a plurality of patterns in the plurality of labelled data points to a plurality of cloud implementation R-lane models. The method may further include classifying a problem domain into a plurality of classes of a cloud strategy based on at least one of the plurality of cloud implementation R-lane models. The method may further include determining an implementable solution by applying at least one of a search, a backtracking, or a constraint propagation model to a plurality of business constrains. The plurality of business constrained may be identified based on the plurality of classes. The method may further include generating an output artifact based on the implementable solution using a belief-desire-intention model.

In one embodiment, a system for generating strategy and roadmap for end-to-end IT infrastructure cloud implementation is disclosed. In one example, the system may include an IT infrastructure cloud implementation device, which may include at least one processor and a memory communicatively coupled to the at least one processor. The memory may store processor-executable instructions, which, on execution, may cause the processor to receive natural language inputs from a plurality of stakeholders with respect to a current IT infrastructure and a future end-to-end IT infrastructure cloud implementation. The processor-executable instructions, on execution, may further cause the processor to receive a plurality of machine acquired data points from a plurality of data centers. The processor-executable instructions, on execution, may further cause the processor to label a plurality of human semantic data points in the natural language inputs, generated using NLP, and the plurality of machine acquired data points into a plurality of labelled data points. The processor-executable instructions, on execution, may further cause the processor to map a plurality of patterns in the plurality of labelled data points to a plurality of cloud implementation R-lane models. The processor-executable instructions, on execution, may further cause the processor to classify a problem domain into a plurality of classes of a cloud strategy based on at least one of the plurality of cloud implementation R-lane models. The processor-executable instructions, on execution, may further cause the processor to determine an implementable solution by applying at least one of a search, a backtracking, or a constraint propagation model to a plurality of business constrains. The plurality of business constrained may be identified based on the plurality of classes. The processor-executable instructions, on execution, may further cause the processor to generate an output artifact based on the implementable solution using a belief-desire-intention model.

In one embodiment, a non-transitory computer-readable medium storing computer-executable instructions for generating strategy and roadmap for end-to-end IT infrastructure cloud implementation is disclosed. In one example, the stored instructions, when executed by a processor, may cause the processor to perform operations including receiving natural language inputs from a plurality of stakeholders with respect to a current IT infrastructure and a future end-to-end IT infrastructure cloud implementation. The operations may further include receiving a plurality of machine acquired data points from a plurality of data centers. The operations may further include labelling a plurality of human semantic data points in the natural language inputs, generated using NLP, and the plurality of machine acquired data points into a plurality of labelled data points. The operations may further include mapping a plurality of patterns in the plurality of labelled data points to a plurality of cloud implementation R-lane models. The operations may further include classifying a problem domain into a plurality of classes of a cloud strategy based on at least one of the plurality of cloud implementation R-lane models. The operations may further include determining an implementable solution by applying at least one of a search, a backtracking, or a constraint propagation model to a plurality of business constrains. The plurality of business constrained may be identified based on the plurality of classes. The operations may further include generating an output artifact based on the implementable solution using a belief-desire-intention model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
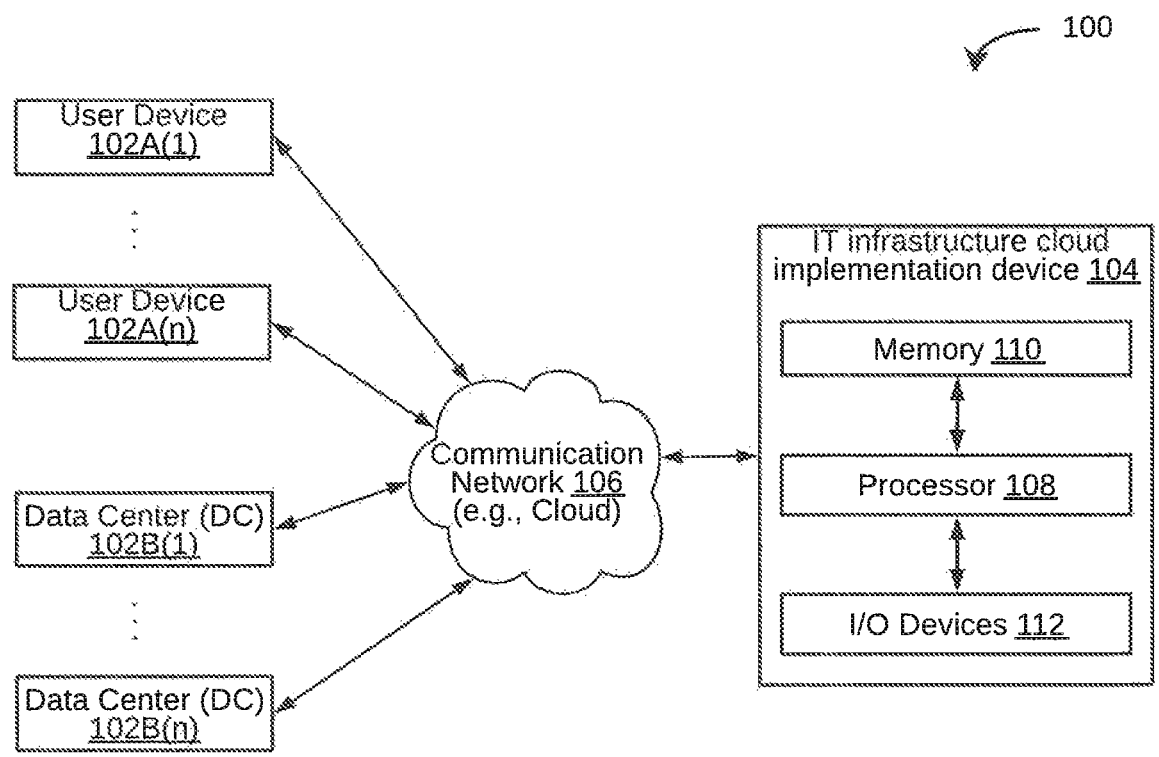
FIG. 1 is a block diagram of an exemplary system for generating strategy and roadmap for end-to-end information technology (IT) infrastructure cloud implementation, in accordance with some embodiments of the present disclosure.

Referring now to FIG. 1, an exemplary system 100 for generating strategy and roadmap for end-to-end information technology (IT) infrastructure cloud implementation is illustrated, in accordance with some embodiments of the present disclosure. The system 100 may include a number of user devices 102A(1), 102A(2) . . . 102A(n) (collectively referred to as user devices 102A), a number of data center 102B(1), 102B(2) . . . 102B(n) (collectively referred to as data centers 102B), and an IT infrastructure cloud implementation device 104. The IT infrastructure cloud implementation device 104 may be communicatively coupled to the user devices 102A and data centers 102B over a communication network 106. The user devices 102A and the data centers 102B may include, but may not be limited to server, desktop, laptop, notebook, netbook, smartphone, and mobile phone. The IT infrastructure cloud implementation device 104 may include one or more processors 108, a computer-readable medium (for example, a memory) 110, and input/output (I/O) devices 112. The computer-readable storage medium 110 may store various data that may be captured, processed, and/or required by the system 100 in general and the IT infrastructure cloud implementation device 104 in particular. The IT infrastructure cloud implementation device 104 may interact with a user via a user interface (not shown) accessible via the input/output (I/O) devices 112.

As will be described in greater detail in conjunction with FIGS. 2-5, the IT infrastructure cloud implementation device 104 may gather data with respect to current IT infrastructure and future end-to-end IT infrastructure cloud implementation from the user devices 102A and data centers 102B. The IT infrastructure cloud implementation device 104 may then process and analyze the gathered data for generating strategy and roadmap for end-to-end IT infrastructure cloud implementation. In particular, the IT infrastructure cloud implementation device 104 may receive natural language inputs from a number of stakeholders (e.g., business owners, application owners, services owners, IT personnel, etc.) with respect to the current IT infrastructure (e.g., including, but not limited to, business criticality, service levels agreement, etc.) and the planned IT infrastructure cloud implementation from the user devices 102A via an artificial intelligence (AI) based conversational agent, and process the natural language inputs, using natural language processing (NLP) to generate human semantic data points. Further, the IT infrastructure cloud implementation device 104 may receive machine acquired data points from the data centers 102B. The IT infrastructure cloud implementation device 104 may then label the human semantic data points and the machine acquired data points into labelled data points. The IT infrastructure cloud implementation device 104 may further identify a number of patterns in the labelled data points and map the patterns to a number of cloud implementation R-lane models. The IT infrastructure cloud implementation device 104 may further classify a problem domain into a number of classes of a cloud strategy based on at least one of the number of cloud implementation R-lane models. The IT infrastructure cloud implementation device 104 may further determine an implementable solution by applying at least one of a search, a backtracking, or a constraint propagation model to a number of business constrains that are identified based on the number of classes. The IT infrastructure cloud implementation device 104 may further generate an output artifact based on the implementable solution using a belief-desire-intention model.

Figure 2:
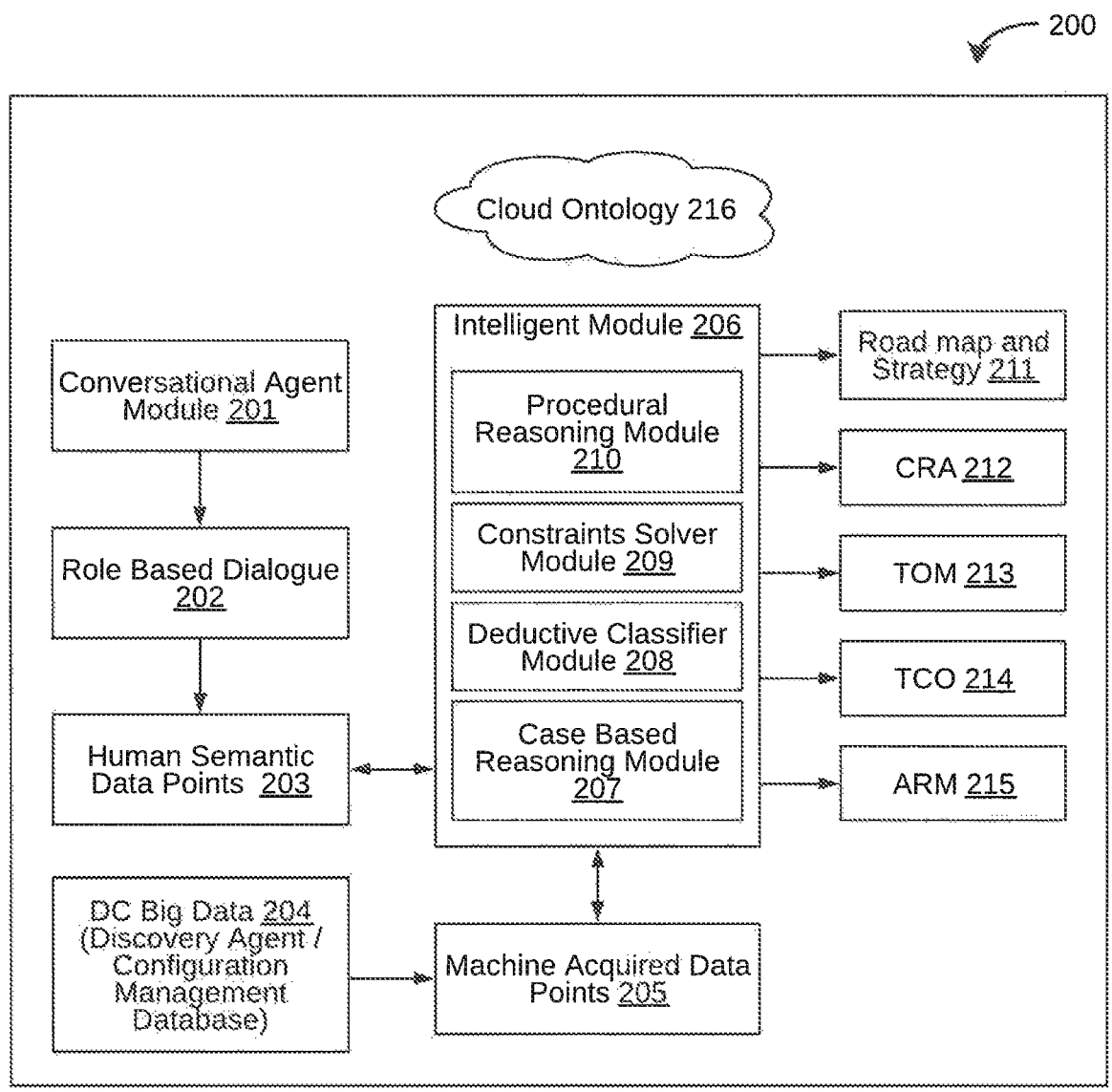
FIG. 2 is a functional block diagram of an exemplary IT infrastructure cloud implementation device, in accordance with some embodiments of the present disclosure.

Referring now to FIG. 2, a functional block diagram of an exemplary IT infrastructure cloud implementation device 200, analogous to the IT infrastructure cloud implementation device 104 of FIG. 1, is illustrated, in accordance with some embodiments of the present disclosure. The IT infrastructure cloud implementation device 200 may include various modules so to generate strategy and roadmap for end-to-end information technology (IT) infrastructure cloud implementation. In some embodiments, the various modules may include a cloud conversational agent module 201 and an intelligent module 206. The cloud conversational agent module 201 may perform role based dialogue 202 with stakeholders so as to receive natural language input and generate human semantic data points 203 using natural language processing. The intelligent module 206 may receive the human semantic data points 203 for subsequent processing. Additionally, the intelligent module 206 may receive the machine acquired data points 205 that are generated from the data center (DC) big data (i.e., data residing at the data center) 204 using discovery tools or configuration management database (CMDB). The intelligent module 206 may include a case based reasoning (CBR) module 207, a deductive classifier module 208, a constraint solver module 209, and a procedural reasoning module 210 so as to process and analyze the human semantic data points 203 and the machine acquired data points 205. Upon processing and analyzing, the intelligent module 206 may generate at least one of a roadmap and strategy 211 and a number of auxiliary work products including, but not limited to, a cloud reference architecture (CRA) 212, a target operating model (TOM) 213, a total cost of ownership (TCO) 214, an auto-discovery mapping to R-lane models and migration plan (ARM) 215, and so forth.

The conversational agent module 201 may implement a conversational agent for interviewing various stakeholders, e.g., persons in different IT and business roles, in an enterprise so as to capture human knowledge and heuristics around applications, services, and systems. In some embodiments, the conversational agent may be implemented over a cloud and may be accessible over various user devices in possession of the stakeholders. The conversational agent 201 may perform role based dialogue 202 with the stakeholders in order to capture their inputs. For example, the conversational agent 201 may capture the critical aspects of the systems, the service level agreements, the characteristics of the system, or the like. It should be noted that the characteristics of the system may include, but may not be limited to, system of record, system of engagement or the like. Further, the conversational agent module 201 may generate human semantic data points 203 from the captured natural language inputs using NLP.

The machine driven knowledge (in form of machine acquired data points 205) may come from data 204 captured by the data center (DC) over a period of time. It should be noted that the machine driven data center knowledge may come with big data characteristics (which may include, but may not be limited to variety, volume, velocity, or the like) about data center assets. It should be noted that the machine driven knowledge may come from at least one of a discovery agent that may use a machine learning, a configuration management database (CMDB) repository, or a variety of sources that may need to be reconciled and then classified utilizing the constraint solvers module 209, the deductive classifier module 208, and the case based reasoning module 207. Further, the intelligent module 206 may merge, overlay and juxtapose the machine driven knowledge 205 with the human semantics 203 using the procedural reasoning module 210.

The intelligent module 206 may then create a custom CRA 212, as one of the output, based on the machine driven knowledge 205 from each unique enterprise data center and the human semantics 203. The CRA 212 may be filled with various cloud ontology nodes 216 including service models (e.g., SaaS, PaaS, IaaS, or the like), deployment models (e.g., private, public, hybrid or the like), cloud actors (e.g., consumer, provider, broker, auditor, carrier, or the like), or other cloud ontology nodes 216. It should be noted that the cloud ontology 216 may dictate which capabilities may be fulfilled with which architectural solution at the conceptual level. For example, in some cases, a capability may be fulfilled by a server less architecture approach. In such cases, the cloud reference may be prescriptive and conceptual. The cloud ontology 216 may, therefore, point to the server less capability in one of the cloud service providers and may map the same on the CRA 212.

Additionally, the procedural reasoning module 210 may have a pattern matching capability for a given domain on the CRA 212. Hence, the CRA 212 may provide the representations (which may include diagrams, models, viewpoints, or the like) with a relationship between these elements. It should be noted that the CRA 212 may be presented in different viewpoints, which may be further configured for customization. The different viewpoints of the CRA 212 may include, but may not be limited to, business viewpoint, technology or technical viewpoint, data viewpoint, application viewpoint, or the like.

As will be appreciated, the business viewpoint of the CRA 212 may represent business entities and the relationship of the business entities in the cloud ontology 216, the technology viewpoint of the CRA 212 may represent a technological stacks and the relationship of the technological stacks in the cloud ontology 216, the data viewpoint of the CRA 212 may represent a data perspective and their relationship in the cloud ontology 216, the application viewpoint of the CRA 212 may represent an application landscape juxtaposed to the cloud ontology 216.

Moreover, the intelligent module 206 may be an artificial intelligence-based reasoning engine responsible for classification and initial reasoning on both machine driven knowledge (i.e., machine learning data center assets data or machine acquired data points 205) and the human driven knowledge (i.e., human semantics and heuristics or human semantics data points 203). The intelligent module 206 may be logically divided into two parts—the first part responsible for analytical or logical intelligence and the second part responsible for cognitive or creative intelligence. In the first part of the intelligent module 206, the case based reasoning module 207, the deductive classifier module 208, and the constraint solver module 209 may be responsible for deploying a unique combination of algorithms which act on both the machine driven discovery data 205 as well as the human semantics 203 captured via cloud assessment interview bots (i.e., conversational agents) using the NLP. In the second part of the intelligent module 206, the procedural reasoning module 210 may gather knowledge and may employ frame languages, abstraction, templates for creating the output which may include, but may not be limited to, the roadmap and strategy 211, the TOM 213, the CRA 212, or the like.

Moreover, the intelligent module 206 may process input data from several sources to create the output deliverable sets for cloud adoption using automated artificial intelligence methods. Thus, the intelligent module 206 may create unique and custom automated artifacts via artificial intelligence means. The first part and the second part of the intelligent module 206 may collaborate in merging classified machine knowledge and human knowledge so as to produce artifacts based on the collective knowledge.

As stated above, the first part of the intelligent module 206 may employ the case based reasoning module 207, the constraint solver module 209, and the deductive classifiers module 208 to parse machine driven data and overlay with human context on application and service criticality, service levels agreements, and other possible key performance indicators (KPIs). The first part may be uniquely deployed to create unique and customized cloud strategy, reference architecture, target operating model, based on a variability of a cloud ontology 216 mapping to the strategy and planning artifacts. Further, the second part of the intelligent module 206 may employ procedural reasoning module 210 to create unique output sets which may include, but may not be limited to, the CRA 212, a cloud migration plan, the TOM 213, application mapping R-lane models, and the like. It should be noted that the application mapping R-lane models are cloud implantation strategy models and may include, but may not be limited to Rehost, Re-platform, Re-purchase, Re-factor, Retire, Retain, Reuse, Reduce or the like.

Moreover, a supervised learning may be utilized in labeling, classification and regression, and output production through the learning and reasoning processes. It should be noted that the supervised learning approach may work well in use cases where the strategy may have to be defined at an interval of three years. Also, an unsupervised learning may be applied to certain situations where a combination of learning approaches may be beneficial to the strategy itself, and to planning elaboration of the learning methods based on the velocity, variety and volume (3Vs) of machine data. It should be noted that the unsupervised learning may be especially useful in cases of big data ingestion where 3Vs of the data may make a less relevant labeling.

Hence, the capability of the unsupervised learning in an embodiment may be applied in one case situations where the strategy and definition may be 'done and closed', as well as in continuous learning situations where the strategy continues to self-define and self-optimize. In ultra-dynamic IT environments, the strategy package may need to be a continuous work in progress with certain defined parameters by at least one of a business unit, geographies or by any other reasons. As will be appreciated, the supervised learning and the unsupervised learning may be deployed together based on the goals of the strategy package.

It should be noted that all such aforementioned modules may be implemented in programmable hardware devices such as programmable gate arrays, programmable array logic, programmable logic devices, or the like. Alternatively, all such aforementioned modules may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

Figure 3:
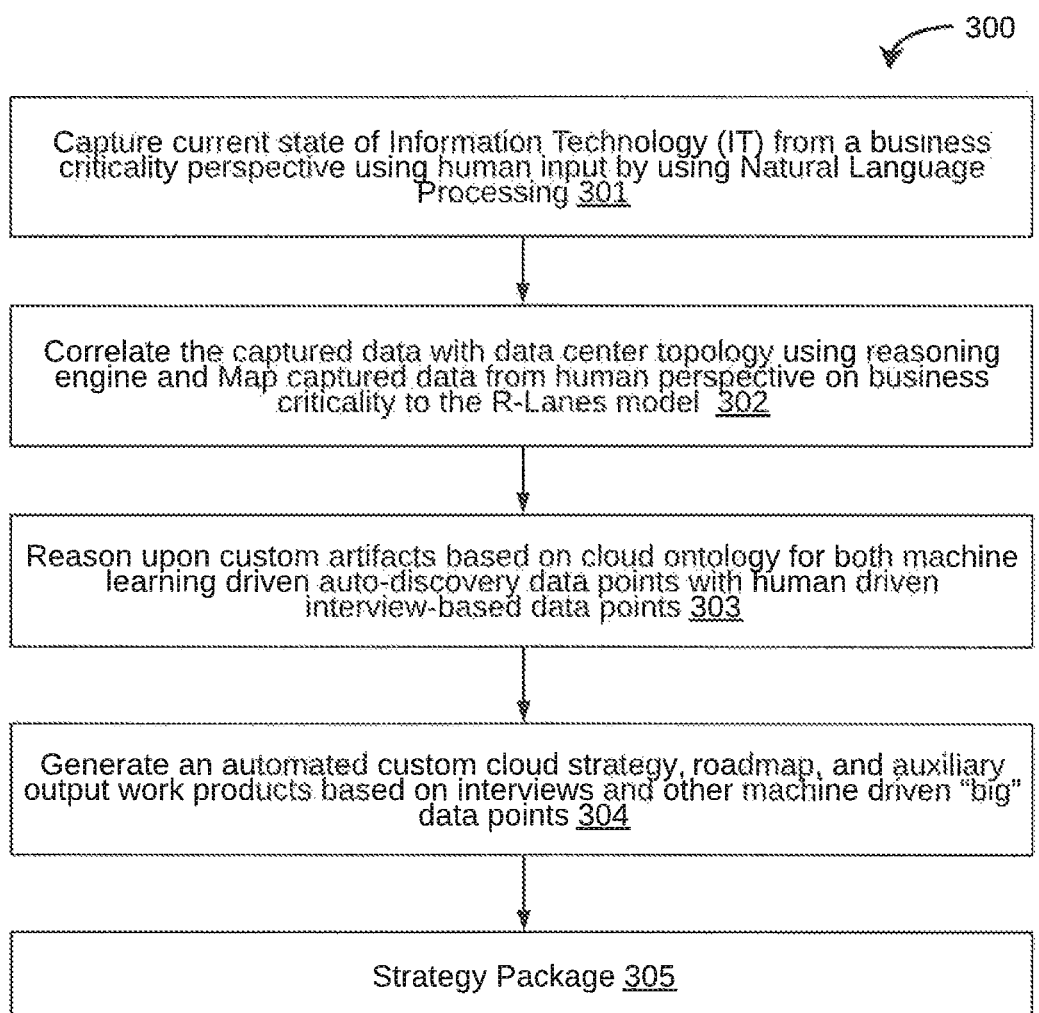
FIG. 3 is a flowchart of an exemplary process overview for generating strategy and roadmap for end-to-end IT infrastructure cloud implementation, in accordance with some embodiments of the present disclosure.

Referring now to FIG. 3, an exemplary process overview 300 for generating strategy and roadmap for end-to-end IT infrastructure cloud implementation, in accordance with some embodiments of the present disclosure. At step 301, the control logic 300 may capture current state of IT from a business criticality perspective using human input by using NLP. The control logic 300 may be adapted to utilize several uniquely integrated artificial intelligence methods to capture the human inputs. For example, the control logic 300 may include an artificial intelligence based conversational agent to interview different roles in IT and business on applications, security, workload and other contextual and heuristic aspects. Further, as discussed above, the control logic 300 may include a number of artificial intelligence based modules as a part of the intelligent module 206 to create the transformation road-map and cloud strategy 211. It should be noted that the input provided during interviews may include business application criticality, workload analysis, security, performance and availability requirements, organizational changes among other data points, or the like.

Moreover, the control logic 300 may process interviews using the artificial intelligence NLP and may utilize the intelligent module 206 to integrate, correlate, and apply human semantics 203 to other data center discovery data points 205. Additionally, the control logic 300 may utilize artificial intelligence and NLP for performing a cloud assessment with each of the business and the IT stakeholders via a plethora of dialogue flows for different roles of the interviewee. The different roles of the interviewee may include, but may not be limited to chief information officer, directors, application owners, infrastructure, operations, development, human resource, change management, release management or the like.

The mission of the NLP interviewer bot (i.e., conversational agent) 201 may be to receive human semantics 203 for applications, services, infrastructures and systems. The NLP interviewer bot 201 may have a custom vocabulary and questionnaire based on different roles of the interviewee. Also, the control logic 300 may implement an initial presentation logic to the intelligent module 206. Hence, the conversational agent 201 may serve as a humanoid interface for the application. Further the service criticality may be captured and sent to the intelligent module 206 to be processed in juxtaposition to machine driven data 205 about data center assets.

Moreover, a discovery agent via machine learning may discover a data center asset to find out which services (as well as application, infrastructure and their interdependencies as an example) may be running and which applications may be executed. However, the human knowledge may not be present in the machine learning data center asset driven discovery to understand and reason, from a human perspective, business criticality, business service level agreements, or the like. Further, the interviewer bot 201 may use the captured knowledge from interviews to overlay the knowledge and to provide a human meaning on the service or application.

Additionally, there may be a reconciliation method in which the input data may be provided and reasoned upon. The reconciliation method may allow merging and juxtaposition of the machine learning data 205 to be juxtaposed to semantically human provided contextual data 203 in the context of automating end-to-end cloud strategy package. Moreover, the interviewer bot 201 may capture at least one of the licensing information, country data restrictions, user population, operational hours, hardware restriction, business criticality, high availability and disaster recovery, mean time to recover (MTTR), recovery time objective (RTO), recovery point objective (RPO), or the like among other dialogue flows. It should be noted that the interviewer bot 201 may question business drivers for the cloud, the KPI metrics of interest or the like.

Further at step 302, the control logic 300 may correlate the captured data with data center topology using the case based reasoning module 207 and may further map the captured data from human perspective on business criticality to the R-lane models. The control logic 300 may correlate the captured data with data center topology using the case based reasoning module 207, the constraint solver module 209, and the deductive classifiers module 208. Moreover, the case based reasoning module 207 may label and match pattern of the machine based discovery data 205 from data center assets to potential R-lane models. Additionally, the case based reasoning module 207 may be used to match existing labels to potential R-lane models by analyzing similarities to existing cases to indicate solutions within the R-lane models.

Further, the case based reasoning module 207 in the intelligent module 206 may utilize the deductive classifier modules 208 and the constraint solver module 209. The case based reasoning module 207 may provide a tenet to cloud classification problems by analyzing similarities with other cloud classification problems for which known solutions may already exist. For instance, when fed data about systems and their dependencies (for example, infrastructure to infrastructure, application to infrastructure, application to services, or the like), the case based reasoning module 207 may label the input data and create clusters of affinity via move groups and potential migration waves by affinity and interdependency.

Further, the case based reasoning (CBR) module 207 may reason and determine R-lane models that may be applied in a given scenario. Based on the determined R-lane models, the CBR module 207 may go down the path of the cloud ontology 216 for customizing the strategy and other artifacts based on ontology nodes necessary for that cloud adoption. Additionally, the case based reasoning module 207 may automate the recommendation to the cloud consumer model that should be adopted for each of the affinity clusters or potential move groups. The cloud consumer model may include, but may not be limited to SaaS, IaaS, PaaS, or the like.

Moreover, based on each of the internal IT assets and the business domain, the case based reasoning module 207 may further customize the strategy with ontology nodes 216 appropriate for that custom strategy. It should be noted that the internal IT assets may include data center, services, applications or the like and the business domain may include financial, government, retail, ecommerce, insurance, manufacturing, pharma, or the like. The case based reasoning module 207 may pick certain compliance packages to be applied towards the strategy based on the domain itself. By way of an example, the case based reasoning module 207 may add federal information security modernization act (FISMA) and federal risk and authorization management program (FedRAMP) to government domains, the health insurance portability and accountability act (HIPPA) for insurance domains, payment card industry data security standard (PCI DSS) for retail domains, or the like. It should be noted that the case based reasoning module 207 may add compliance packages based on the target domain.

Moreover, the case based reasoning module 207 may perform reasoning based on what in the data center infrastructure may be re-hosted (i.e., moving from datacenter to cloud), what may be re-platformed (i.e., moving database from database vendor A to database Vendor B), what may be refactored or re-architected (i.e., moving from mainframe to server less 'function-as-a-service' architecture), what may be reduced (i.e., optimized in the cloud or in the data center), what may be retired (i.e., sunset of systems and infrastructure) and what may be retained (i.e., which may not go to cloud for hardware restrictions, regulatory restrictions, or any other restriction), or the like.

By way of an example, a re-hosting systems from one hosting environment to the cloud and the re-platforming dataset from database vendor A to database vendor B may use analogical reasoning to infer solutions based on case histories of found assets, interview bot based fed analytics, and classification patterns. Moreover, for domain level classifications, the intelligent module 206 may use the deductive classifier module 208. It should be noted that the deductive classifier module 208 may work on the case based reasoning module 207 as a meta rule-based sub-system and may be represented as a component of artificial intelligence knowledge for the intelligent module 206 conceptualized as a frame language to be used in the reasoning process itself.

Further, the deductive classifier module 208 may describe the problem domain as a set of classes, subclasses, and interdependent relations among the classes. Further, the case based reasoning module 207 may create a custom cloud ontology model 216, which may be similar to an object-oriented model. However, unlike object-oriented models, the frame language may be a formal semantics based on first order logic passed on by the intelligent module 206. The first order logic may determine the R-lane disposition model coming from the case based reasoning module 207 of the intelligent module 206 and the target hosting model on the cloud for a particular interdependent sets of workloads, applications and services.

Moreover, the first order logic, besides R-lane models disposition, may overlay with the target state cloud service model (e.g., SaaS, IaaS, PaaS, XaaS, or the like) as well as the cloud ontology 216 for the consumer model. The cloud ontology 216 may also cover the other cloud ontology nodes which may include cloud provider, cloud security, cloud service orchestration, cloud service management, cloud auditor, cloud broker, or the like. It should be noted that the cloud ontology 216 may also cover R-lane models, Migration Wave Models, Move Group Models, Hosting Models (which may include IaaS, SaaS, PaaS and other variations on them such as BPaaS, AIaaS, FaaS, XaaS or the like).

Additionally, the purpose of the deductive classifier module 208 in the intelligent module 206 may be to serve as a rule based artificial intelligent knowledge representation in frame languages for a given domain and a custom set of assets which may be unique to each enterprise (even those within the same domain). The R-lane domain modeling may be semantic that describes the problem domain of each of the R-lane domains. Additionally, the deductive classifiers module 208 may take R-lane models mapping from the case based reasoning module 207 and further apply R-lane domain specific semantic logic on the R-lane models to overlay given knowledge before passing it on to the constraint solver module 209.

The constraint solver module 209 may be utilized as the last bucket in the flow of artificial intelligence algorithms to work on the data provided by the case based reasoning module 207 and the deductive classifier module 208 in relation to the cloud ontology 216, and the unique data set at hand. Additionally, the constraint solver module 209 may act as a final resolving judge whose verdict may exclude ontology nodes from the artifacts for final recommendation. Moreover, the constraint solver module 209 may solve constraint satisfaction problems (CSPs) in a programmatic and declarative ways. It should be noted that the cloud constraint may be a condition which must be met with a valid solution to a problem looking at the suitability of a system or application to service to the cloud. The cloud constraints may be defined declaratively and may be applied to variables within a given domain. The constraint solver module 209 may use at least one of a search, a backtracking, and constraint propagation model to determine implementable solutions. It should be noted that the constraint solver module 209 may be used in the sense of identifying infrastructure or business constraints. In some embodiments, the constraint solver module 209 may also use at least one of a domain set, a geography set, or the like to determine implementable solutions.

By way of an example, the business constraints may be unique for a certain business domain (e.g., retail, financial, insurance, manufacturing, government, etc.) as well for each unique customer within the certain domain. Further, a same customer in a same domain may not have the same strategy and roadmap recommendation because of a uniqueness of each business in a total context (e.g., including geographical, legal, regulatory, and other such contexts). For example, a company may have operations in different countries. The legal and regulatory constraints of each country on where data may reside and where the data may be stored may, as an example, influence the strategy and roadmap packages for the same company in different geographies. Thus, in some embodiments, each of the generated output(s) may be unique to each domain, to each customer in the domain, to each business unit of the customer, and so forth.

Moreover, the business constraints may be comprised of different compliances and security related constraints. By way of an example, a compliance constraint may be that the organization must comply with FISMA legislation and Fedramp high compliance. Another constraint may be to be compliant to PCI DSS standards or HIPPA, or for that matter any other standard, policy or compliance framework that may require full compliance and adherence. An infrastructure constraint may be illustrated in a hardware dependency. By way of an example, in airport domain, anything that may have a dependency on a certain hardware (i.e., any physical or hardware dependency of a system) may be a constraint. Typically, the baggage systems at airports may be tied to specific hardware and have to be located near ticketing terminals. In this case, it may be the constraint to physically move the baggage systems to the cloud. Similarly, a programmable logic controller (PLC) such as in baggage handling systems, scales and other peripherals may be dependent on a specific type of hardware and may not be portable to the cloud. Hence, the R-lane model for such cases may be 'retain', at least for the short-term. In certain cases, the constraint may result in a 'revise' or 'retain' or other R-lane models mapping which currently prevents a certain workload or application migration to the cloud. In certain cases, the constraint solver may point to a compliance (which may include FISMA, PCI, SOX or any other compliance framework) that needs to be met.

The constraint solver module 209 may learn from the case based reasoning module 207 about a certain requirement for compliance, and reason upon the same by utilizing the knowledge so as to properly map to R-lane models and landing zones. For example, a Fedramp compliant business may be mapped to one of the government instances in cloud service providers. The R-lane model may be indicated for a short term and a long term perspective. In the short term, the constraint solver module 209 may indicate, for example, a re-host to the cloud, while, in the long term, the constraint solver module 209 may indicate an opportunity to re-platform or re-factor the service or application. Further, based on the knowledge passed onto the constraint solver module 209 by the case based reasoning module 207 and other sources, the ontology nodes (that compose the transformation and strategy package) may be custom arranged based on the data and the reasoning (upon the data provided). It may spell out both a short term action and a long term action or opportunity for the business to be transformed. This knowledge may then be passed to the procedural reasoning module 210, which may, in turn, produce automated output(s) based on the knowledge.

Moreover, the constraints solver module 209 may also be utilized in solving constraints based on data coming from the human interviewer bot (i.e., conversational agent) 201. By way of an example, during interview the Chief Information Officer (CIO) may express the desire to have Business Process as a Service (BPaaS) as a primary candidate for his applications and systems or to exit all data centers in five years. So, the principle may be used as a criterion which may be sent to the intelligent module 206 for consideration and inclusion in the roadmap and strategy 211, the CRA 212, the TOM 213, and other artifacts. Thus, the human knowledge may steer and guide the strategy as much as machine driven knowledge. The intelligent module 206 may process data center data 205 but may not know about human semantics and heuristics 203 until the intelligent module 206 may be fed by the interviewer bot 201. Moreover, the critical information may be a part of the criteria which servers also as a principle for the strategy drivers.

Further at step 303, the control logic 300 may reason upon custom artifacts based on cloud ontology 216 for both machine learning driven auto-discovery data points 205 with human driven interview-based data points 203. The exemplary system may be adapted to factor the current Total Cost of Ownership (TCO) and produce an output anywhere from a Rough Order of Magnitude (ROM) to a more precise TCO comparative analysis among top cloud services providers (for example, Amazon, IBM, Microsoft, Google, or the like) based on the quality and detail of the input data.

Further, at step 304, the control logic 300 may generate an automated cloud strategy roadmap based outputs based on interviews and other data points. The automated cloud strategy roadmap based outputs may include, but may not be limited to Target Operating Model (TOM) 213, Cloud Reference Architecture (CRA) 212, Auto-discovery Based R-lane Maps & Migration Plan (ARM) 215, or the like. The output of the solution may be a strategy package with a set of deliverables that define the cloud strategy for any use case and/or cross domain utility. The output may produce a package based on reasoning applied on each of the bot interviews on humans and other machine learning, and driven integrated data points.

Moreover, the solution may propose the generation of an end-to-end cloud and digital transformation strategy which may contain custom assets. For example, the ARM 215, the TOM 213, the CRA 212, the Comparative TCO/ROI 214, or the like. Further, based on the R-lane models, the intelligent module 206 may query real-time application programming interface (APIs) on cloud services providers to calculate TCO 214 based on real-time data and report back to the strategy package to provide accurate financial insight and map to the strategy itself and to its business case.

Further, the procedural reasoning module 210 may be used to produce the output based on knowledge gained from the case based reasoning module 207, the constraint solver module 209, and the deductive classifiers module 208. In particular, the procedural reasoning module 210 may implement a unique algorithm for reasoning and selecting cloud plans. The selection may come from a machine learning procedural knowledge base, which comes from each of the deductive classifiers module 208 and the case based reasoning module 207 of the intelligent module 206. In other words, the case based reasoning module 207, the constraint solver module 209, and the deductive classifiers module 208 may feed reasoned knowledge into the procedural reasoning module 210, which may then implement a final belief-desire-intention model so as to automate the creation of the output artifacts for the cloud strategy.

Each cloud output from the intelligent module 206 may represent a course of action for achievement of a given cloud goal that may be customized to a company or organization's IT environment. Hence, the goal of the intelligent module 206 may be to orchestrate and automate the generation of a cloud adoption, the cloud and digital transformation roadmap and strategy 211, the CRA 212, the ARM 215, the TOM 213, or the like. It should be noted that each of the cloud output may be customized based not only on the domain, but also on custom knowledge coming from each of the data center and humans, and reasoned upon by the intelligent module 206.

Further, the procedural reasoning module 210 may implement a belief-desire-intention model by reasoning over facts ('beliefs') to select appropriate plans ('Intentions') for given goals ('desires'). The procedural reasoning module 210 may implement the belief-desire-intention model by reasoning over machine learning and human collected facts ('beliefs') to select appropriate plans ('Intentions') for given goals ('desires') and produce the outputs which may include, but may not be limited to, the roadmap and strategy 211, the CRA 212, the ARM 215, the TOM 213, Role Based Business & IT Dialogue Flows, or the like. Some of the outputs may be explained in greater detail herein below.

The roadmap and strategy 211 may be one of the main outputs from the intelligent module 206. One of the function of the intelligent module 206 in a phased approach may be to produce an automated cloud strategy roadmap with planning, architecture, implementation or the like. The roadmap may have any of the top value chain actions spelled out by other outputs of the intelligent module 206 using the cloud ontology 216, the CRA 212 and the TOM 213 as metadata. Moreover, the roadmap may maintain a high level and executive view of the cloud adoption. Also, the roadmap may point out a high-level timeline along with the top strategies or milestones required to achieve cloud adoption. Additionally, the roadmap may point out the need for a governance board and infer the number of participants from different areas of the business and information technology which may include, but may not be limited to, architecture, change management, project management, operations, security, or the like. The strategy and roadmap 211 may cover many core organizational, functional and non-functional layered tenets including, but not limited to, following:
  a) People—organization structure, roles and responsibilities, training and enablement, cloud first and cloud only culture, or the like.
  b) Processes—agile, PMO, DevOps, quality assurance, governance or the like.
  c) Technology—engineering, automation, tool/frameworks, innovation, open source, or the like.
  d) Finance—financial governance, business case, TCO/ROI, risk & cost controls, optimization, or the like.
  e) Transition & Transformation—assessment, migration roadmap, workload migration, planning, or the like.
  f) Operations—operational governance & excellence, automation & optimization, monitoring and metrics, ZeroOps, NoOps, AIOps, tools & platforms, or the like.
  g) Security & Compliance—security strategy, control framework, regulatory compliance, auditing, IAM, risk management, IR, or the like.
  h) Architecture—Multi-cloud, Cloud-Native, Microservices/API, applications, infrastructure, integration, performance, or the like.

The CRA 212 may be one of the main outputs from the intelligent module 206. Different domains (e.g., financial, government, retail, insurance, airport, or the like) may have a set of pre-established reference architectures with component level mapping descriptions of capabilities. The CRA 212 may be a template driven document which may describe and recommend best practices, hence serving as a guiding principle for selecting technologies from an information technology catalogue. The CRA 212 may guide a delivery method for the selected capabilities and technologies. It should be noted that the CRA 212 may be domain based and may provide standardization as well as a common vocabulary for the domain users.

The TOM 213 may be another main output from the intelligent module 206. The TOM 213 may be a description of the desired state of an organization. This output may take human semantics 203 and machine driven data 205 to depict a "Current State" and a "Future State". Moreover, the TOM 213 may be a prediction machine that may use on one hand the machine driven data center asset data 205, and on the other hand human based interviews to assign business criticality, service level agreements and other human driven semantics 203. The TOM 213 may provide a guide on how services in a value-chain may be delivered to customers or stakeholders. Additionally, the TOM 213 may be the link between strategy and technology in order to provide a unique prescription of how the operating model needs to be fulfilled with technology capability stacks for each of the receptacles. The TOM 213 may specify many control layers for the cloud at several levels.

It should be noted that the IT business control may include, but may not be limited to, IT financial, supplier, risk and demand management, or the like, whereas the service control may include, but may not be limited to, service operations, quality management, service show back and metering, service and operational reporting, operations control, infrastructure control, a plethora of other combinations of operating model components, or the like.

The cloud ontology 216, utilized by the intelligent module 206 to be reasoned upon, may include all or any combination of the cloud domains or sub domains. Additionally, it should be noted that the cloud ontology 216 may be flexible to have other configurable capabilities such as to add other categories adjusted based on unique domain and enterprises, data and needs. Some of the ontology nodes are listed below. However, it should be noted that the reasoning done by the intelligent module 206 to produce the strategy package may not be limited to below listed ontology nodes. Thus, the ontology nodes may include, but may not be limited to:
  a) Cloud Service Layer: The cloud service layer may include software as a service (SaaS), platform as a service (PaaS), infrastructure as a service (IaaS), or other variations on the consumer layer such as BPaaS, XaaS, AIaaS, or the like.
  b) Cloud Provider Layer & Service Deployment Model: The cloud provider layer & service deployment model may include private cloud, community cloud, public cloud, hybrid cloud, multi-cloud, or the like.
  c) Service Orchestration Layer: The service orchestration layer may include service layer model, resource abstraction and control layer, physical resource layer, or the like.
  d) Cloud Services Management & Business Layer: The cloud services management & business layer may be responsible for customer management, contract management, inventory management, accounting and billing, reporting and auditing, pricing and rating, or the like.
  e) Portability/Interoperability Layer: The portability/interoperability layer may be responsible for data portability, services interoperability, system portability, or the like.
  f) Provisioning/Configuration Layer: The provisioning/configuration layer may be responsible for rapid provisioning, resource change, monitoring and reporting, metering, SLA management, or the like.

g) Security: The security may include authentication and authorization layer, availability, confidentiality.

h) Identity Management: The identity management may be responsible for integrity, security monitoring and incident response, security policy management, privacy, or the like.

i) Cloud Carrier Layer: The cloud carrier layer may be responsible for cloud distribution, electronic transfer, physical transfer, or the like.

j) Cloud Access Layer: The cloud access layer may include mobile endpoints, fixed endpoints, or the like.

k) Cloud Broker Layer: The cloud broker layer may be responsible for service consumption, service provision, service intermediation, service aggregation, service arbitrage, or the like.

l) Cloud Auditor Layer: The cloud auditor layer may be responsible for security audit, privacy impact audit, performance audit, or the like.

The role based business and IT dialogue flow may serve as a special purpose of collecting the human knowledge 203 from different roles in the IT and business context of an organization (e.g., CIO, CTO, VPs, application and service owners, infrastructure owners, or the like.). The dialogue flow may collect a human context about applications business criticality, service level agreements, or the like. Further, it may provide the human knowledge 203 to be intermingled with machine learning knowledge 205 which may include data center assets, an application, a service or the like. The value of the function may be to reason with human context upon machine learning driven data 205.

A machine learning agent may learn about data center assets and discover its relationships. By way of an example, the machine learning agent may see that a certain chassis runs a certain appliance, in turn the appliance runs a set of services and applications. It should be noted that the applications may be interdependent of the infrastructure and other services. However, with all the information and data, there may not be knowledge of the criticality or importance and service level agreements for these discovered assets. Therefore, the human context may become crucial in the elaboration and production of a cloud strategy. Additionally, machine learning agent may take into account what may be business important and human critical. It should be noted that such context may not be learnt directly from the data center discovery exercise. Further, the machine learning agent may use human knowledge 203 about discovered assets via machine learning and serves as a semantic layer for juxtaposition over the machine driven discovery data 205. Hence, the machine learning agent may add human context to machine driven data 205 in order to automate the creation of the strategy package.

The cloud assessment interviewer bot 201 (also referred to as integrated voice enabled conversational agent, or conversational agent, or interactive conversational agent) may be the NLP interviewer bot whose mission may be to take human context for applications, services, infrastructure, systems or the like. Further, the cloud assessment interviewer bot 201 may have a custom vocabulary and a questionnaire based on the role of the interviewee (e.g., infrastructure, application, security and data owners, change management, and C-Level executive—CTO, CIO, etc., or the like). Moreover, the cloud assessment interviewer bot 201 may implement an initial presentation logic to the intelligent module 206. The cloud assessment interviewer bot 201 may serve as a humanoid interface for the application and service criticality to be captured and then sent to the intelligent module 206 to be processed and contextualized in juxtaposition to machine driven data 205 about data center assets.

By way of an example, a discovery agent via machine learning may discover a data center asset and find out which services (as well as application, infrastructure, their inter-dependencies, etc.) are running and which applications are being executed. However, as discussed above, the human knowledge may be lacking or limited in the machine data center asset driven discovery. This impedes the understanding, classification, and reasoning from a human perspective based on at least one of a business criticality, business service level agreements, and other business relevant tenets. The interviewer bot 201 may utilize its captured knowledge from interviews to overlay the knowledge on the service or application criticality so as to give it human meaning. There may be a reconciliation process which may happen as input data is provided and reasoned upon. It should be noted that the reasoning process may allow the merging and the juxtaposition of machine learning data 205 and semantically human-driven data points 203.

As will be appreciated by one skilled in the art, a variety of processes may be employed for generating strategy and roadmap for end-to-end IT infrastructure cloud implementation. For example, the exemplary system 100 and the associated IT infrastructure cloud implementation device 104 may generate strategy and roadmap for end-to-end IT infrastructure cloud implementation by the processes discussed herein. In particular, as will be appreciated by those of ordinary skill in the art, control logic and/or automated routines for performing the techniques and steps described herein may be implemented by the system 100 and the associated IT infrastructure cloud implementation device 104, either by hardware, software, or combinations of hardware and software. For example, suitable code may be accessed and executed by the one or more processors on the system 100 or the associated IT infrastructure cloud implementation device 104 to perform some or all of the techniques described herein. Similarly, application specific integrated circuits (ASICs) configured to perform some or all of the processes described herein may be included in the one or more processors on the system 100 or on the IT infrastructure cloud implementation device 104.

Figure 4:
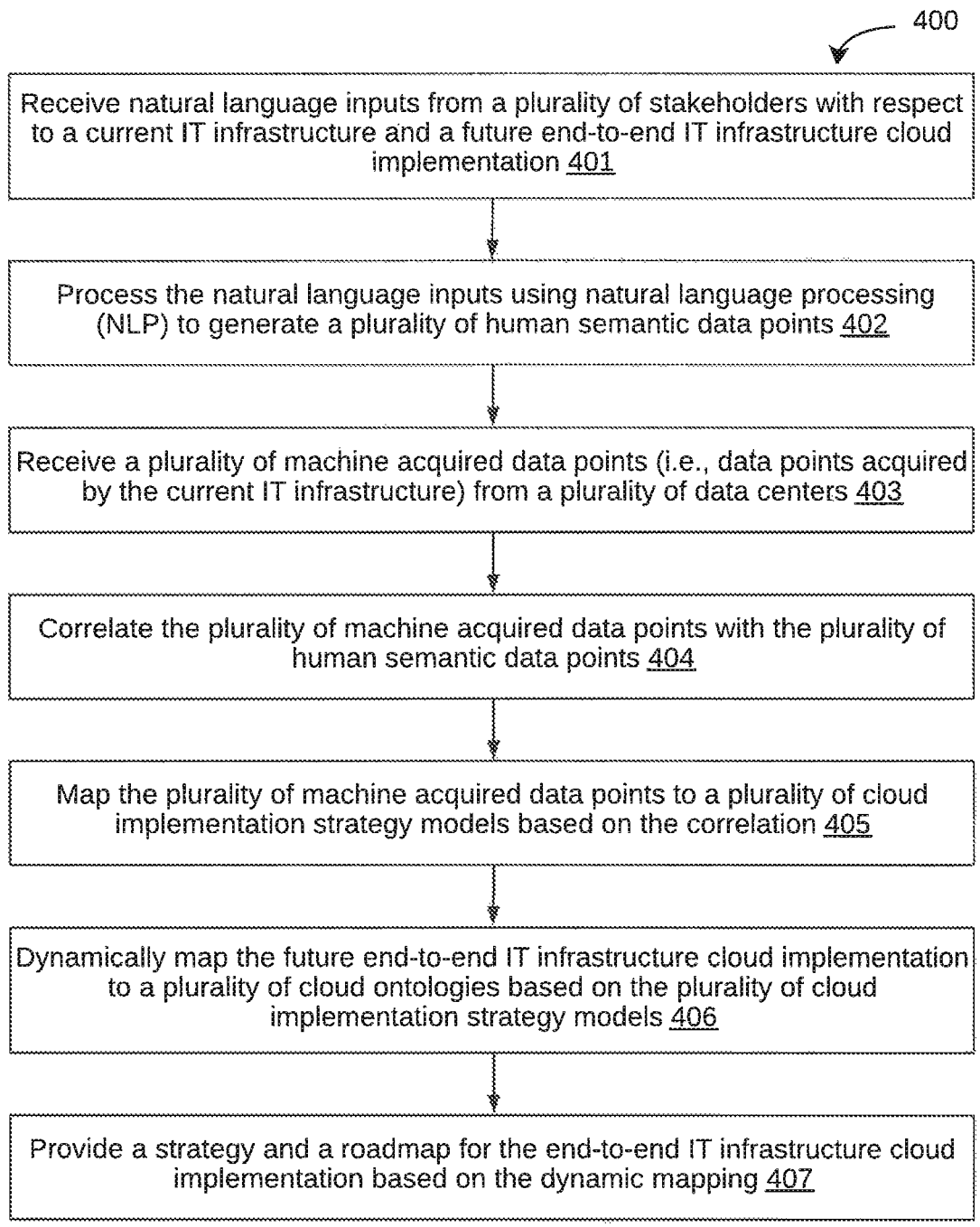
FIG. 4 is a flow diagram of an exemplary process for generating strategy and roadmap for end-to-end IT infrastructure cloud implementation, in accordance with some embodiments of the present disclosure.

For example, referring now to FIG. 4, an exemplary process 400 for generating strategy and roadmap for end-to-end IT infrastructure cloud implementation is depicted via a flowchart, in accordance with some embodiments of the present disclosure. As illustrated in the flowchart, the exemplary process 400 may include the steps of receiving natural language inputs from a plurality of stakeholders with respect to a current IT infrastructure and a future end-to-end IT infrastructure cloud implementation at step 401; processing the natural language inputs using natural language processing (NLP) to generate a plurality of human semantic data points 203 at step 402; receiving a plurality of machine acquired data points 205 (i.e., data points acquired by the current IT infrastructure) from a plurality of data centers at step 403; correlating the plurality of machine acquired data points 205 with the plurality of human semantic data points 203 at step 404; mapping the plurality of machine acquired data points 205 to a plurality of cloud implementation strategy models based on the correlation at step 405; dynamically mapping the future end-to-end IT infrastructure cloud implementation to a plurality of cloud ontologies based on the plurality of cloud implementation strategy models at step 406; and providing a strategy and a roadmap for the end-to-end IT infrastructure cloud implementation based on the dynamic mapping, quantitative sources, and qualitative sources at step 407.

In some embodiments, receiving natural language inputs at step 401 may include the step of receiving a variety of natural language inputs from a variety of sources. For example, the natural language inputs may include at least one of business inputs, technology inputs, data inputs, application inputs, or the like with respect to at least one of systems, services, applications, or the like of the current IT infrastructure and the future end-to-end IT infrastructure cloud implementation. Further, for example, the stakeholders may include business stakeholders, IT stakeholders, end users, or the like. Further, in some embodiments, receiving the natural language inputs at step 401 may include the step of receiving the natural language inputs using an interactive conversational agent. It should be noted that, in such embodiments, the interactive conversational agent may be an artificial intelligence (AI) based conversational agent.

Additionally, in some embodiments, mapping the plurality of machine acquired data points 205 at step 405 may include the steps of labelling the plurality of machine acquired data points 205 into one of a set of clusters based on the correlation, wherein the set of clusters correspond to a set of semantic contexts derived from the plurality of human semantic data points 203, and matching a pattern of the plurality of machine acquired data points 205 in each of the set of clusters with each of a plurality of patterns of the plurality of cloud implementation strategy models. It should be noted that the plurality of cloud implementation strategy models may include models for at least one of re-hosting, re-platforming, replacing, re-purchasing, re-factoring, revising, reusing, reducing, retaining, or retiring. Additionally, it should be noted that the plurality of cloud ontologies 216 may be derived from the plurality of human semantic data points 203 and the plurality of machine acquired data points 205.

Further, in some embodiments, dynamically mapping the future end-to-end IT infrastructure cloud implementation at step 406 may include the step of applying domain specific semantic logic to the plurality of cloud implementation strategy models Further, in some embodiments, providing the strategy and the roadmap at step 407 may include the step of generating an implementable solution for the end-to-end IT infrastructure cloud implementation by resolving a plurality of constraints among the plurality of ontologies. In such embodiments, providing the strategy and the roadmap at step 407 may include the step of determining a number of recommendations for the implementable solution. For example, the recommendations may include an enterprise level recommendation package including cloud roadmap, TOM, CRA, TCO analysis, among other assets. Further, in such embodiments, providing the strategy and the roadmap at step 407 may include the step of providing a comparative analysis among the number of recommendations, e.g., based on TCO analysis.

Figure 5:
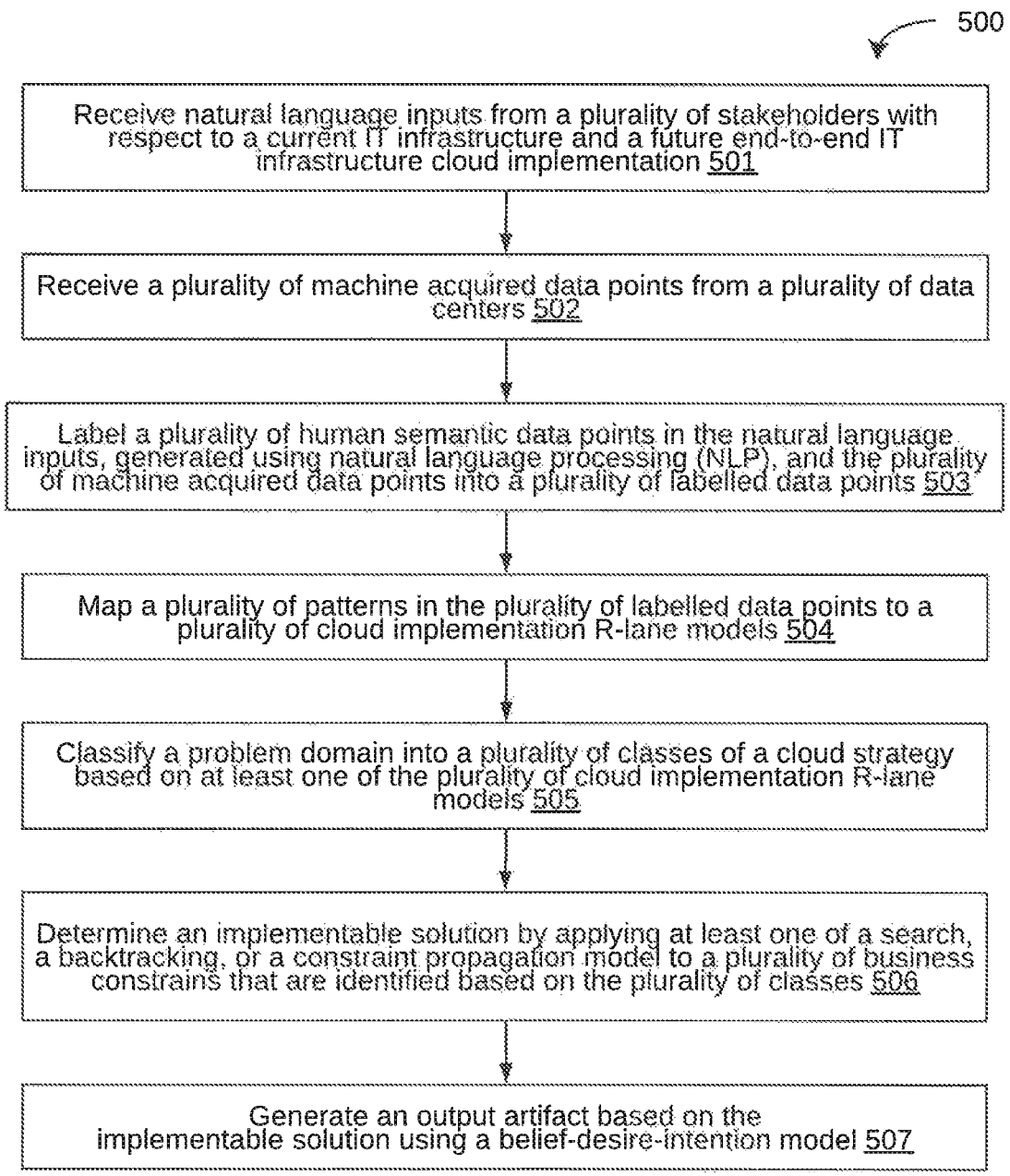
FIG. 5 is a flow diagram of a detailed exemplary process for generating strategy and roadmap for end-to-end IT infrastructure cloud implementation, in accordance with some embodiments of the present disclosure.

Referring now to FIG. 5, an exemplary process 500 for generating strategy and roadmap for end-to-end IT infrastructure cloud implementation is depicted in greater detail via a flowchart, in accordance with some embodiments of the present disclosure. As illustrated in the flowchart, the exemplary process 500 may include the steps of receiving natural language inputs from a plurality of stakeholders with respect to a current IT infrastructure and a future end-to-end IT infrastructure cloud implementation at step 501; receiving a plurality of machine acquired data points 205 from a plurality of data centers at step 502; labelling a plurality of human semantic data points 203 in the natural language inputs, generated using natural language processing (NLP), and the plurality of machine acquired data points 205 into a plurality of labelled data points at step 503; mapping a plurality of patterns in the plurality of labelled data points with respect to a plurality of cloud implementation R-lane mapping models at step 504; classifying a problem domain into a plurality of classes of a cloud strategy based on at least one of the plurality of cloud implementation R-lane mapping models at step 505; determining an implementable solution by applying at least one of a search, a backtracking, or a constraint propagation model to a plurality of business constrains at step 506; and generating an output artifact based on the implementable solution using a belief-desire-intention model at step 507. It should be noted that the plurality of business constrained are identified based on the plurality of classes.

As stated above, in some embodiments, receiving natural language inputs at step 501 may include the step of receiving at least one of business inputs, technology inputs, data inputs, or application inputs, with respect to at least one of systems, services, or applications of the current IT infrastructure and the future end-to-end IT infrastructure cloud implementation, from at least one of business stakeholders, IT stakeholders, or end users. Further, in some embodiments, receiving the natural language inputs at step 501 may include the step of receiving the natural language inputs using an interactive conversational agent. It should be noted that, in such embodiments, the interactive conversational agent may be an artificial intelligence (AI) based conversational agent.

Further, in some embodiments, classifying the problem domain into a plurality of classes at step 505 may include the step of applying domain specific semantic logic to the plurality of cloud implementation R-lane models. It should be noted that the plurality of cloud implementation R-lane models may be adapted to implement at least one of re-hosting, re-platforming, replacing, re-purchasing, re-factoring, revising, reusing, reducing, retaining, or retiring. Further, in some embodiments, determining the implementable solution at step 506 may include the steps of determining a number of possible solutions and determining a comparative analysis of a total cost of ownership (TCO) among the number of possible solutions.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
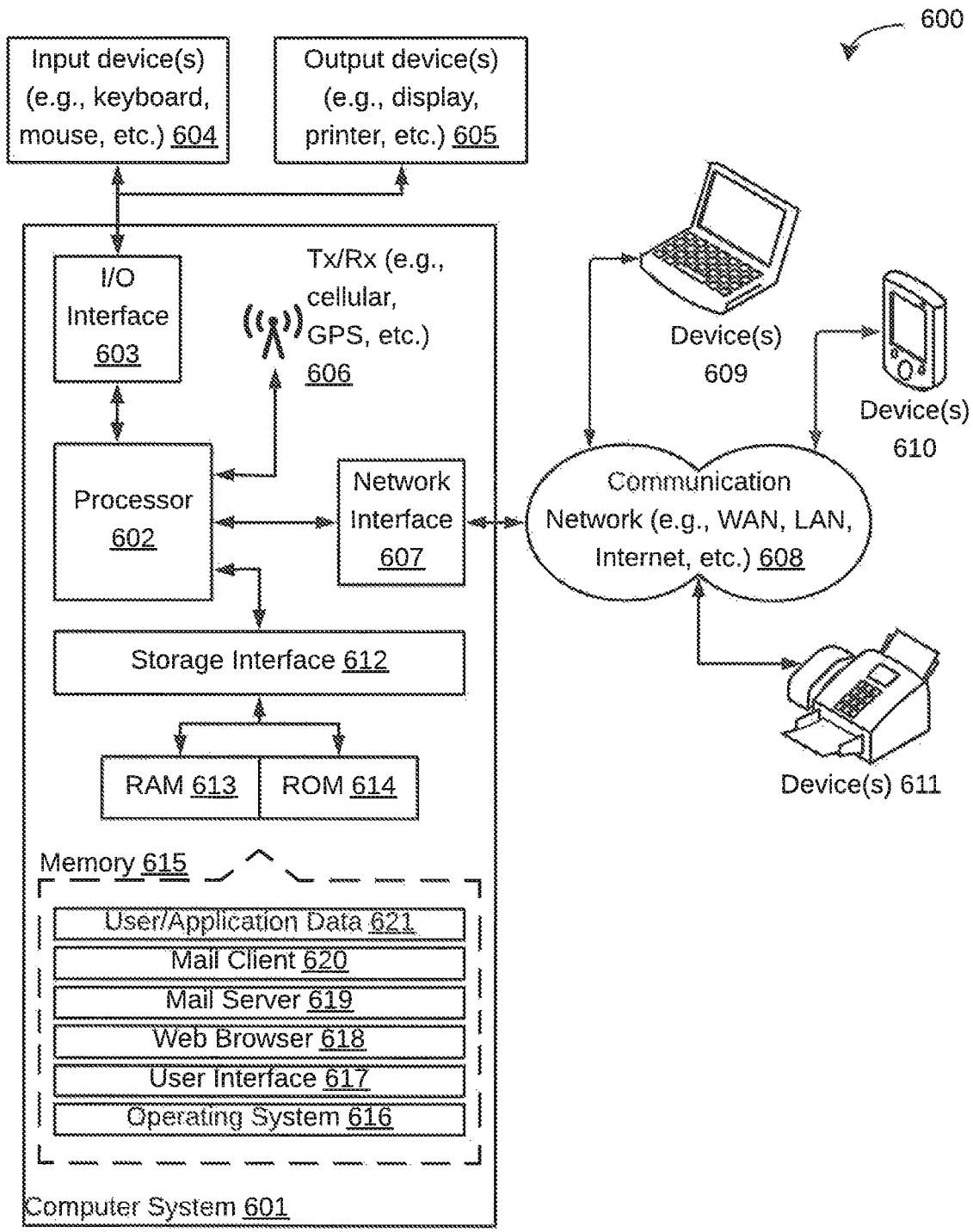
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing user devices 102A, data centers 102B, or the IT infrastructure cloud implementation device 104 of the system 100 so as to generate strategy and roadmap for end-to-end IT infrastructure cloud implementation. Computer system 601 may include a central processing unit ("CPU" or "processor") 602. Processor 602 may include at least one data processor for executing program components for executing user-generated or system-generated requests. A user may include a person, a person using a device such as those included in this disclosure, or such a device itself. The processor 602 may include specialized processing units such as integrated system (bus) controllers, memory management control units, floating point units, graphics processing units, digital signal processing units, etc. The processor 602 may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver 606 may facilitate various types of wireless transmission or reception. For example, the transceiver 606 may include an antenna operatively connected to a transceiver chip (e.g., TEXAS INSTRUMENTS® WILINK WL1286®, BROADCOM® BCM45501UB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices 609, 610, and 611 may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices 609, 610, and 611.

In some embodiments, the processor 602 may be disposed in communication with one or more memory devices (e.g., RAM 613, ROM 614, etc.) via a storage interface 612. The storage interface 612 may connect to memory devices 615 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 615 may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems 616 include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces 617 may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser 618 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers 618 may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server 619 may be an Internet mail server such as MICROSOFT® EXCHANGE®, or the like. The mail server 619 may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server 619 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 601 may implement a mail client 620 stored program component. The mail client 620 may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., natural language inputs, machine acquired data points, human semantics, pattern, implementable solution, belief-desire-intention model, and the like and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems 601 discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above create a cross domain dynamic artificial intelligence based conversational agent to interview IT and business roles on application criticality, workloads, security, performance, cost, and other topics as an input. The conversational agent may cross reference a variety of data points to automate the creation of a series of artifacts in a strategy package. The techniques discussed above may add the human component via the interviews to contextualize business criticality as well as enhances the customer experience with natural processing language and dynamic interaction.

Moreover, the techniques described in various embodiments discussed above provide both business and IT communities with a participatory role in using AI in dialogue flows for capturing diverse data points on IT business and operational criticality using natural processing language, thereby enhancing the user experience and providing a tight integration to the reasoning engine. Additionally, the techniques discussed above may apply meaning and business criticality semantics to what has been captured in auto discovery via machine-driven approach. In short, the techniques described in various embodiments discussed above may bring machine and human knowledge together to automate the production of strategy package artifacts.

The specification has described method and system for generating strategy and roadmap for end-to-end IT infrastructure cloud implementation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating strategy and roadmap for end-to-end information technology (IT) infrastructure cloud implementation, the method comprising:
   receiving, by an IT infrastructure cloud implementation device, natural language inputs from a plurality of stakeholders with respect to a current IT infrastructure and a future end-to-end IT infrastructure cloud implementation;
   receiving, by the IT infrastructure cloud implementation device, a plurality of machine acquired data points from a plurality of data centers;
   labelling, by the IT infrastructure cloud implementation device, a plurality of human semantic data points in the natural language inputs, generated using natural language processing (NLP), and the plurality of machine acquired data points into a plurality of labelled data points, wherein a plurality of patterns is identified based on the labelling of plurality of human semantic data points and the plurality of machine acquired data points;

mapping, by the IT infrastructure cloud implementation device, the plurality of patterns in the plurality of labelled data points to a plurality of cloud implementation R-lane models, wherein a cloud reference architecture (CRA) is generated based on the mapping, wherein the CRA comprises of one or more cloud ontology nodes, deployment models and cloud actors;

classifying, by the IT infrastructure cloud implementation device, a problem domain into a plurality of classes of a cloud strategy based on at least one of the plurality of cloud implementation R-lane models;

determining, by the IT infrastructure cloud implementation device, an implementable solution by applying at least one of a search, a backtracking, or a constraint propagation model to a plurality of business constrains, wherein the plurality of business constrains are identified based on the plurality of classes; and generating, by the IT infrastructure cloud implementation device, an output artifact based on the implementable solution using a belief-desire-intention model.

2. The method of claim 1, wherein receiving the natural language inputs comprise receiving at least one of business inputs, technology inputs, data inputs, or application inputs, with respect to at least one of systems, services, or applications of the current IT infrastructure and the future end-to-end IT infrastructure cloud implementation, from at least one of business stakeholders, IT stakeholders, or end users.

3. The method of claim 1, wherein receiving the natural language inputs comprise receiving the natural language inputs using an interactive conversational agent, and wherein the interactive conversational agent is an artificial intelligence (AI) based conversational agent.

4. The method of claim 1, wherein the plurality of cloud implementation R-lane models are adapted to implement at least one of re-hosting, re-platforming, replacing, re-purchasing, re-factoring, revising, reusing, reducing, retaining, or retiring.

5. The method of claim 1, wherein classifying comprises applying domain specific semantic logic to the plurality of cloud implementation R-lane models.

6. The method of claim 1, wherein determining the implementable solution comprises:
   determining a number of possible solutions; and
   determining a comparative analysis among the number of possible solutions.

7. A system for generating strategy and roadmap for end-to-end information technology (IT) infrastructure cloud implementation, the system comprising:
   an IT infrastructure cloud implementation device comprising at least one processor and a computer-readable medium storing instructions that, when executed by the at least one processor, cause the at least one processor to:
      receive natural language inputs from a plurality of stakeholders with respect to a current IT infrastructure and a future end-to-end IT infrastructure cloud implementation;
      receive a plurality of machine acquired data points from a plurality of data centers;
      label a plurality of human semantic data points in the natural language inputs, generated using natural language processing (NLP), and the plurality of machine acquired data points into a plurality of labelled data points, wherein a plurality of patterns is identified based on the labelling of plurality of human semantic data points and the plurality of machine acquired data points;
      map the plurality of patterns in the plurality of labelled data points to a plurality of cloud implementation R-lane models, wherein a cloud reference architecture (CRA) is generated based on the mapping,
      wherein the CRA comprises of one or more cloud ontology nodes, deployment models and cloud actors;
      classify a problem domain into a plurality of classes of a cloud strategy based on at least one of the plurality of cloud implementation R-lane models;
      determine an implementable solution by applying at least one of a search, a backtracking, or a constraint propagation model to a plurality of business constrains, wherein the plurality of business constrains are identified based on the plurality of classes; and
      generate an output artifact based on the implementable solution using a belief-desire-intention model.

8. The system of claim 7, wherein receiving the natural language inputs comprise receiving at least one of business inputs, technology inputs, data inputs, or application inputs, with respect to at least one of systems, services, or applications of the current IT infrastructure and the future end-to-end IT infrastructure cloud implementation, from at least one of business stakeholders, IT stakeholders, or end users.

9. The system of claim 7, wherein receiving the natural language inputs comprise receiving the natural language inputs using an interactive conversational agent, and wherein the interactive conversational agent is an artificial intelligence (AI) based conversational agent.

10. The system of claim 7, wherein the plurality of cloud implementation R-lane models are adapted to implement at least one of re-hosting, re-platforming, replacing, re-purchasing, re-factoring, revising, reusing, reducing, retaining, or retiring.

11. The system of claim 7, wherein classifying comprises applying domain specific semantic logic to the plurality of cloud implementation R-lane models.

12. The system of claim 7, wherein determining the implementable solution comprises:
   determining a number of possible solutions; and
   determining a comparative analysis among the number of possible solutions.

13. A non-transitory computer-readable medium storing computer-executable instructions for generating strategy and roadmap for end-to-end information technology (IT) infrastructure cloud implementation, the non-transitory computer-readable medium configured for:
   receiving natural language inputs from a plurality of stakeholders with respect to a current IT infrastructure and a future end-to-end IT infrastructure cloud implementation;
   receiving a plurality of machine acquired data points from a plurality of data centers;
   labelling a plurality of human semantic data points in the natural language inputs, generated using natural language processing (NLP), and the plurality of machine acquired data points into a plurality of labelled data points, wherein a plurality of patterns is identified based on the labelling of plurality of human semantic data points and the plurality of machine acquired data points;

mapping the plurality of patterns in the plurality of labelled data points to a plurality of cloud implementation R-lane models, wherein a cloud reference architecture (CRA) is generated based on the mapping,
wherein the CRA comprises of one or more cloud ontology nodes, deployment models and cloud actors;
classifying a problem domain into a plurality of classes of a cloud strategy based on at least one of the plurality of cloud implementation R-lane models;
determining an implementable solution by applying at least one of a search, a backtracking, or a constraint propagation model to a plurality of business constrains, wherein the plurality of business constrains are identified based on the plurality of classes; and
generating an output artifact based on the implementable solution using a belief-desire-intention model.

14. The non-transitory computer-readable medium of claim 13, wherein receiving the natural language inputs comprise receiving at least one of business inputs, technology inputs, data inputs, or application inputs, with respect to at least one of systems, services, or applications of the current IT infrastructure and the future end-to-end IT infrastructure cloud implementation, from at least one of business stakeholders, IT stakeholders, or end users.

15. The non-transitory computer-readable medium of claim 13, wherein receiving the natural language inputs comprise receiving the natural language inputs using an interactive conversational agent, and wherein the interactive conversational agent is an artificial intelligence (AI) based conversational agent.

16. The non-transitory computer-readable medium of claim 13, wherein the plurality of cloud implementation R-lane models are adapted to implement at least one of re-hosting, re-platforming, replacing, re-purchasing, re-factoring, revising, reusing, reducing, retaining, or retiring.

17. The non-transitory computer-readable medium of claim 13, wherein classifying comprises applying domain specific semantic logic to the plurality of cloud implementation R-lane models.

18. The non-transitory computer-readable medium of claim 13, wherein determining the implementable solution comprises:
determining a number of possible solutions; and
determining a comparative analysis among the number of possible solutions.

* * * * *